United States Patent
Hong et al.

(10) Patent No.: US 10,895,952 B2
(45) Date of Patent: Jan. 19, 2021

(54) METHOD AND SYSTEM FOR PERFORMING ASSESSMENT OF SPATIAL ABILITY OF A USER

(71) Applicant: National Taiwan Normal University, Taipei (TW)

(72) Inventors: Jon-Chao Hong, Taipei (TW); Kai-Hsin Tai, Taipei (TW); Chi-Ruei Tsai, Taipei (TW)

(73) Assignee: NATIONAL TAIWAN NORMAL UNIVERSITY, Taipei (TW)

(*) Notice: Subject to any disclaimer, the term of this patent is extended or adjusted under 35 U.S.C. 154(b) by 126 days.

(21) Appl. No.: 16/013,714

(22) Filed: Jun. 20, 2018

(65) Prior Publication Data
US 2019/0250791 A1    Aug. 15, 2019

(30) Foreign Application Priority Data
Feb. 12, 2018 (TW) ............... 107104912 A

(51) Int. Cl.
| | |
|---|---|
| *G06F 3/0484* | (2013.01) |
| *G06F 3/0481* | (2013.01) |
| *G06T 19/20* | (2011.01) |
| *G06F 3/0482* | (2013.01) |
| *G09B 7/02* | (2006.01) |

(52) U.S. Cl.
CPC ........ *G06F 3/04815* (2013.01); *G06F 3/0482* (2013.01); *G06F 3/04817* (2013.01); *G06F 3/04845* (2013.01); *G06T 19/20* (2013.01); *G09B 7/02* (2013.01)

(58) Field of Classification Search
CPC ............ G06F 3/04815; G06F 3/04817; G06F 3/0482; G06F 3/04845; G06T 19/20; G09B 7/02
See application file for complete search history.

(56) References Cited

U.S. PATENT DOCUMENTS

| | | | |
|---|---|---|---|
| 2002/0032546 A1* | 3/2002 | Imamura ............ | G06Q 30/0601 703/1 |
| 2002/0107674 A1* | 8/2002 | Bascle ................... | G06F 3/011 703/1 |

(Continued)

OTHER PUBLICATIONS

Chinese Search Report for Chinese Application No. 201810154851.X, dated Oct. 21, 2020, with English translation.

(Continued)

*Primary Examiner* — Rinna Yi
(74) *Attorney, Agent, or Firm* — Birch, Stewart, Kolasch & Birch, LLP

(57) ABSTRACT

A method to be implemented by a processor includes steps of: generating an assessment interface which includes a projection graphic that depicts a projection of an expected virtual object onto a plane; controlling a display to display the assessment interface thus generated; controlling, after receiving a movement instruction or a rotation instruction, the display to refresh display of the assessment interface such that a selected one of building block(s) is moved or rotated; and controlling, when it is determined that an asserted virtual object formed by an arrangement of the building block(s) shown in the assessment interface conforms with the expected virtual object, the display to display a result of the assessment.

6 Claims, 9 Drawing Sheets

(56) References Cited

U.S. PATENT DOCUMENTS

| | | | | |
|---|---|---|---|---|
| 2013/0222393 | A1* | 8/2013 | Merrell | G06T 11/00 |
| | | | | 345/441 |
| 2014/0132633 | A1* | 5/2014 | Fekete | G06T 11/60 |
| | | | | 345/634 |
| 2015/0321427 | A1* | 11/2015 | Gunnarsson | B33Y 50/00 |
| | | | | 700/98 |

OTHER PUBLICATIONS

QQTN, "Projekt Game Download," URL:https://m.qqtn.com/mipq/290150.html, Dec. 6, 2017, 2 pages with English translation.

\* cited by examiner

METHOD AND SYSTEM FOR PERFORMING ASSESSMENT OF SPATIAL ABILITY OF A USER

CROSS-REFERENCE TO RELATED APPLICATION

This application claims priority of Taiwanese Invention Patent Application No. 107104912, filed on Feb. 12, 2018.

FIELD

The disclosure relates to a method and a system for performing assessment, and more particularly to a method and a system for performing assessment of spatial ability of a user.

BACKGROUND

A conventional method for performing assessment of spatial ability of a user is implemented by a pencil-and-paper test. In the pencil-and-paper test, the user is requested to draw a three-view drawing of an object and to submit the three-view drawing as an answer. According to correctness of the answer, a result of the assessment of the spatial ability of the user is determined.

SUMMARY

An object of the disclosure is to provide a method and a system for performing assessment of spatial ability of a user.

According to one aspect of the disclosure, the system includes a display, an input device and a processor. The processor is electrically connected to the display and the input device. The processor is configured to generate an assessment interface. The assessment interface includes a virtual three-dimensional environment having a horizontal plane, a first vertical plane, a second vertical plane, and a menu showing options of a plurality of building blocks. The horizontal plane, the first vertical plane and the second vertical plane are perpendicular to each other and cooperatively define a virtual space. The first vertical plane is illustrated with a first projection graphic which depicts a projection of an expected virtual object in the virtual space onto the first vertical plane. The processor is configured to control the display to display the assessment interface thus generated. The processor is configured to control, after receiving a movement instruction designating a translational movement via the input device, the display to refresh display of the assessment interface on the display such that a selected one of the building block(s) is moved in the virtual space. The processor is configured to control, after receiving a rotation instruction designating a rotational movement via the input device, the display to refresh display of the assessment interface on the display such that the selected one of the building block(s) is rotated in the virtual space. The processor is configured to control, when it is determined by the processor that an asserted virtual object formed by an arrangement of the building block(s) in the virtual space conforms with the expected virtual object that corresponds to the first projection graphic, the display to display a result of the assessment indicating that the user answered correctly.

According to another aspect of the disclosure, the method is to be implemented by the system that is previously described. The method includes steps of:

generating, by the processor, an assessment interface which includes a virtual three-dimensional environment having a horizontal plane, a first vertical plane, a second vertical plane, and a menu showing options of a plurality of building block(s), the horizontal plane, the first vertical plane and the second vertical plane being perpendicular to each other and cooperatively defining a virtual space, the first vertical plane being illustrated with a first projection graphic which depicts a projection of an expected virtual object in the virtual space onto the first vertical plane;

controlling, by the processor, the display to display the assessment interface thus generated;

controlling, by the processor after receiving a movement instruction designating a translational movement via the input device, the display to refresh display of the assessment interface on the display such that a selected one of the building block(s) is moved in the virtual space;

controlling, by the processor after receiving a rotation instruction designating a rotational movement via the input device, the display to refresh display of the assessment interface on the display such that the selected one of the building block(s) is rotated in the virtual space; and controlling, by the processor when it is determined by the processor that an asserted virtual object formed by an arrangement of the building block(s) in the virtual space conforms with the expected virtual object that corresponds to the first projection graphic, the display to display a result of the assessment indicating that the user answered correctly.

BRIEF DESCRIPTION OF THE DRAWINGS

Other features and advantages of the disclosure will become apparent in the following detailed description of the embodiment with reference to the accompanying drawings, of which.

DETAILED DESCRIPTION

Figure 1:
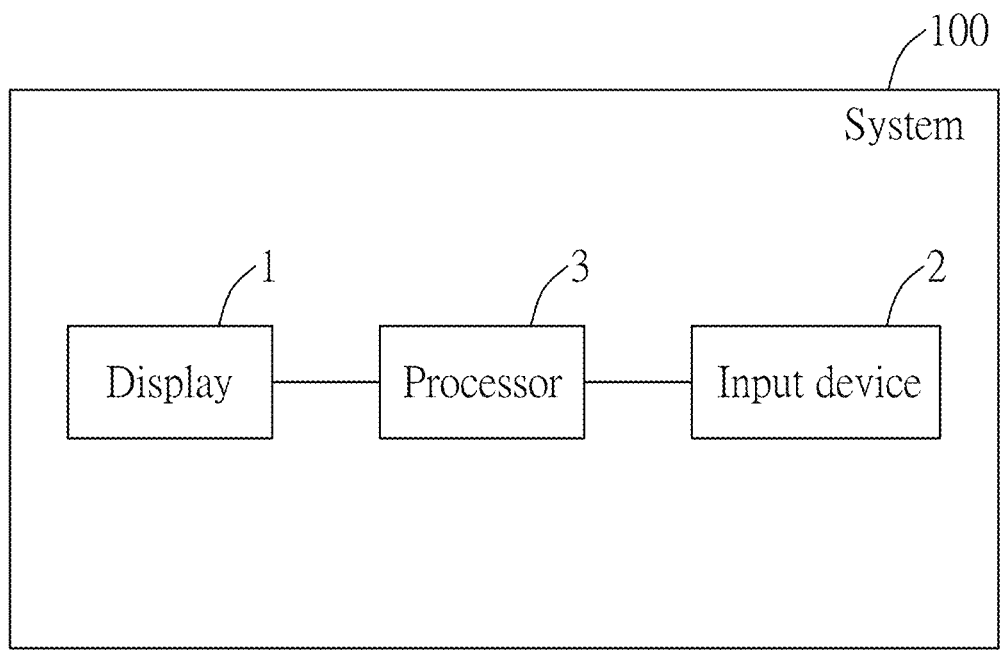
FIG. 1 is a block diagram illustrating an embodiment of a system for performing assessment of spatial ability of a user according to the disclosure.

Referring to FIG. 1, an embodiment of a system 100 for performing assessment of spatial ability of a user is illustrated. The system 100 includes a display 1, an input device 2 and a processor 3. The processor 3 is electrically connected to the display 1 and the input device 2. In this embodiment, the system 100 is implemented by a tablet computer, but implementation is not limited thereto and may vary in other embodiments. For example, the system 100 may be implemented by a smartphone, or a virtual reality system including a head-mounted display and a controller, such as a virtual reality gloves.

Figure 3:
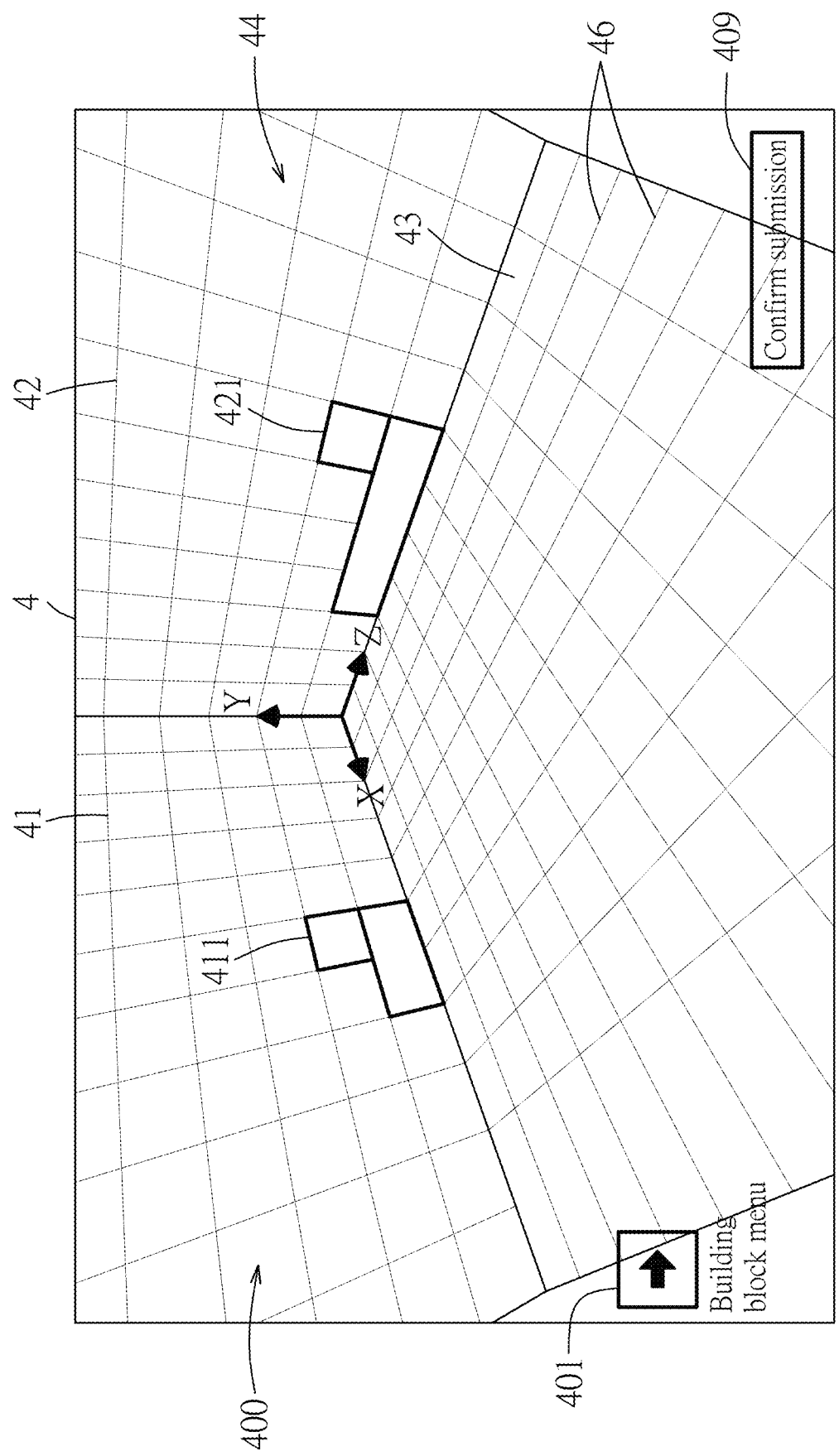
FIG. 3 is a schematic diagram illustrating an embodiment of an assessment interface utilized in the method according to the disclosure.
Figure 4:
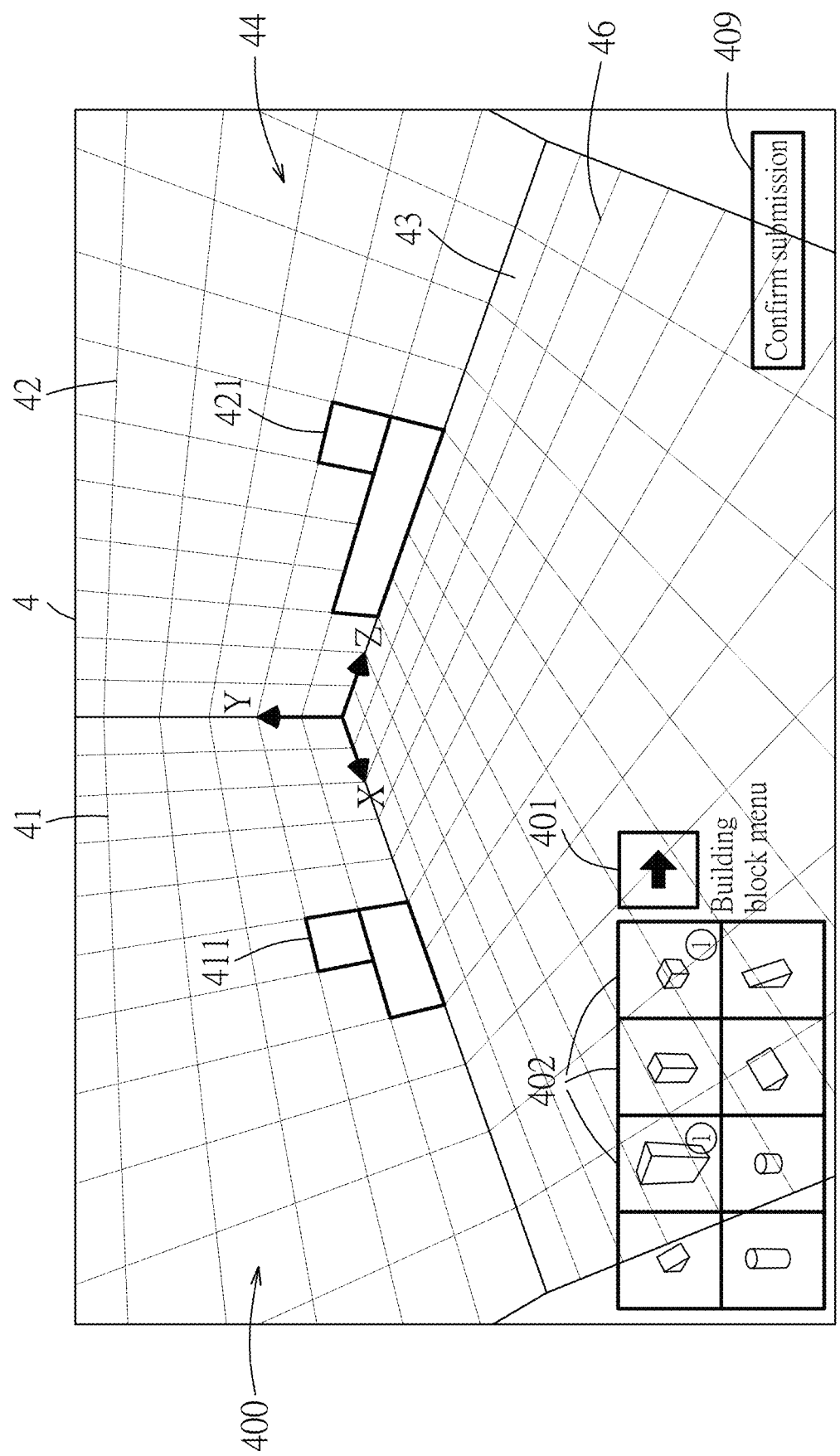
FIG. 4 is a schematic diagram illustrating an embodiment of a menu showing options of a plurality of building blocks in the assessment interface.
Figure 5:
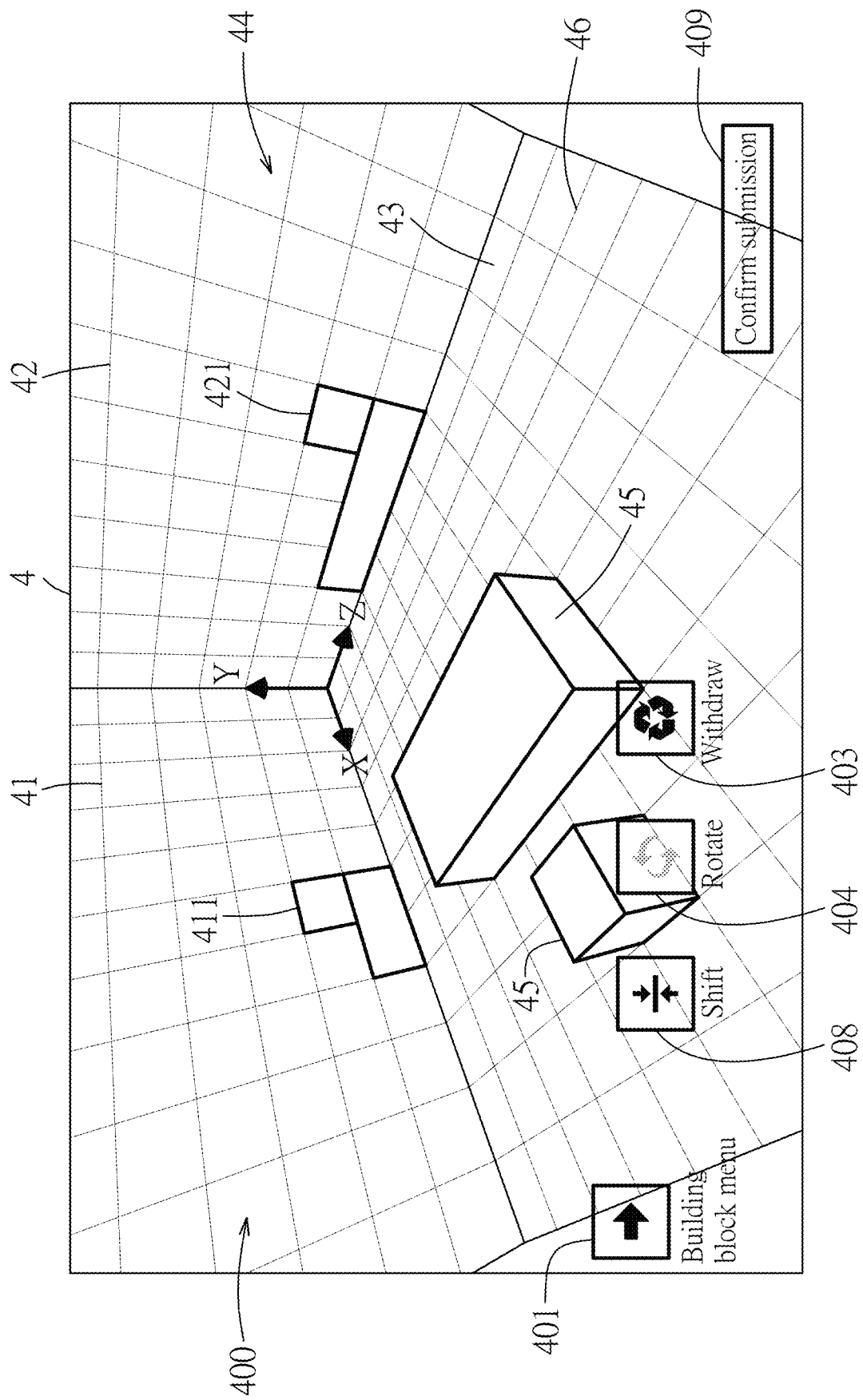
FIG. 5 is a schematic diagram illustrating embodiments of options for operating a selected one of the building block(s) in the assessment interface.

Referring to FIG. 3, the processor 3 is configured to generate an assessment interface 4 which includes a virtual three-dimensional environment 400 having a horizontal plane 43, a first vertical plane 41, a second vertical plane 42, and a menu showing options of a plurality of building blocks 402 as shown in FIG. 4. The horizontal plane 43, the first vertical plane 41 and the second vertical plane 42 are perpendicular to each other and cooperatively define a virtual space 44. The virtual three-dimensional environment 400 further includes grids 46 distributed on the horizontal plane 43, the first vertical plane 41 and the second vertical plane 42. The first vertical plane 41 is illustrated with a first projection graphic 411 which depicts a projection of an expected virtual object in the virtual space 44 onto the first vertical plane 41. The second vertical plane 42 is illustrated with a second projection graphic 421 which depicts another projection of the expected virtual object in the virtual space 44 onto the second vertical plane 42. The processor 3 is configured control the display 1 to display the assessment interface 4 thus generated. The processor 3 is configured to control, after receiving a selection instruction designating a selected one of the building blocks via the input device 2, the display 1 to refresh display of the assessment interface 4 on the display 1 such that the selected one of the building blocks appears in the virtual space 44 (i.e., building blocks 45 as shown in FIG. 5). The processor 3 is configured to control, after receiving a withdrawal instruction designating withdrawal of a selected one of the building block(s) 45 in the virtual space 44 via the input device 2, the display 1 to refresh display of the assessment interface 4 on the display 1 such that the selected one of the building block(s) 45 disappears in the virtual space 44. The processor 3 is configured to control, after receiving a movement instruction designating a translational movement via the input device 2, the display 1 to refresh display of the assessment interface 4 on the display 1 such that a selected one of the building block(s) 45 is moved in the virtual space 44. The processor 3 is configured to control, after receiving a rotation instruction designating a rotational movement via the input device 2, the display 1 to refresh display of the assessment interface 4 on the display 1 such that the selected one of the building block(s) 45 is rotated in the virtual space 44. The processor 3 is configured to adjust, after receiving a viewpoint adjustment instruction designating a change of viewpoint via the input device 2, the viewpoint of the virtual space 44 in the three-dimensional environment 400 on the display 1. The processor 3 is configured to control, when it is determined by the processor 3 that an asserted virtual object formed by an arrangement of the building block(s) 45 in the virtual space 44 conforms with the expected virtual object, the display 1 to display a result of the assessment indicating that the user has answered correctly.

Figure 2A:
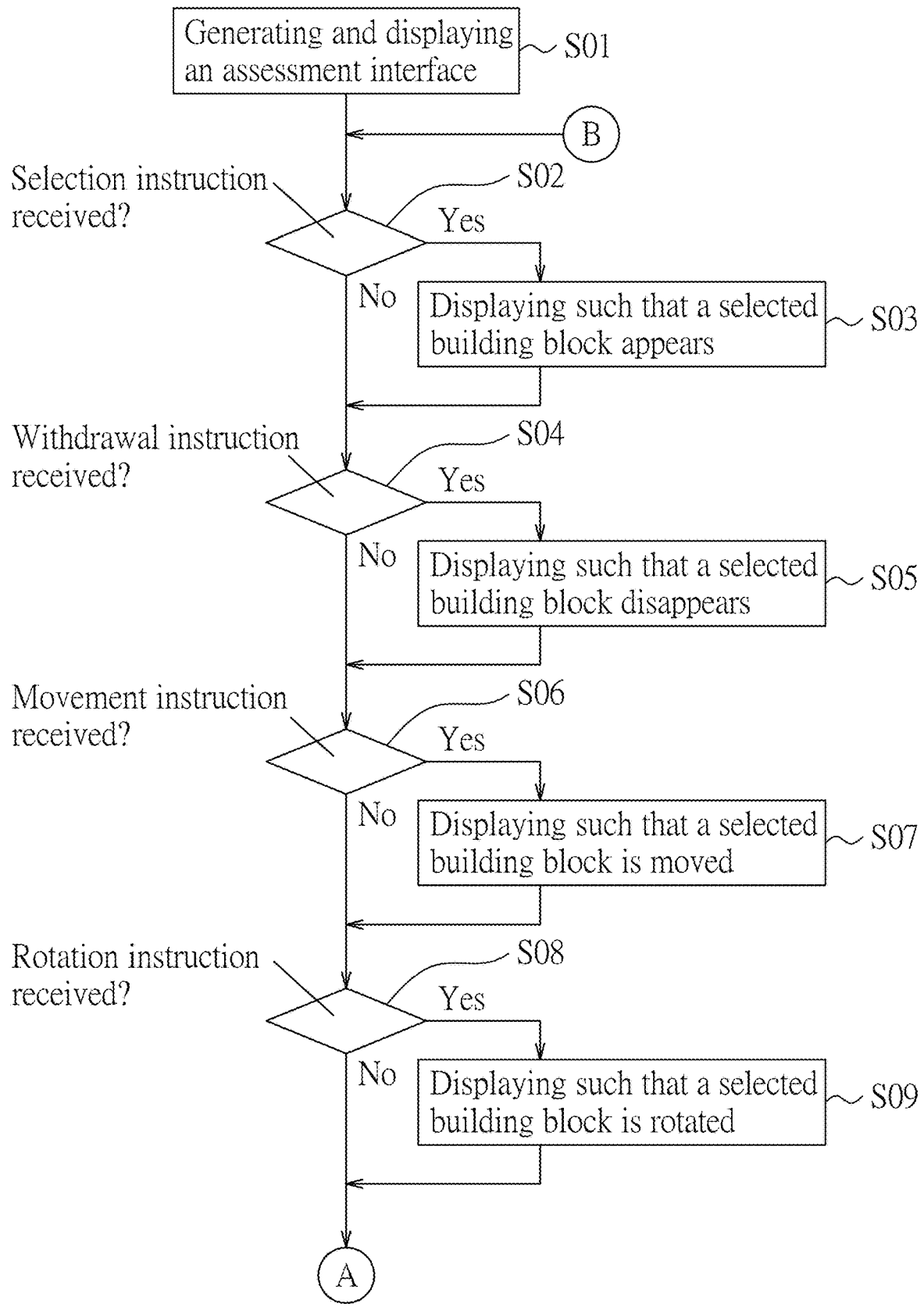
FIGS. 2A and 2B cooperatively form a flow chart illustrating an embodiment of a method for performing assessment of spatial ability of a user according to the disclosure.
Figure 2B:
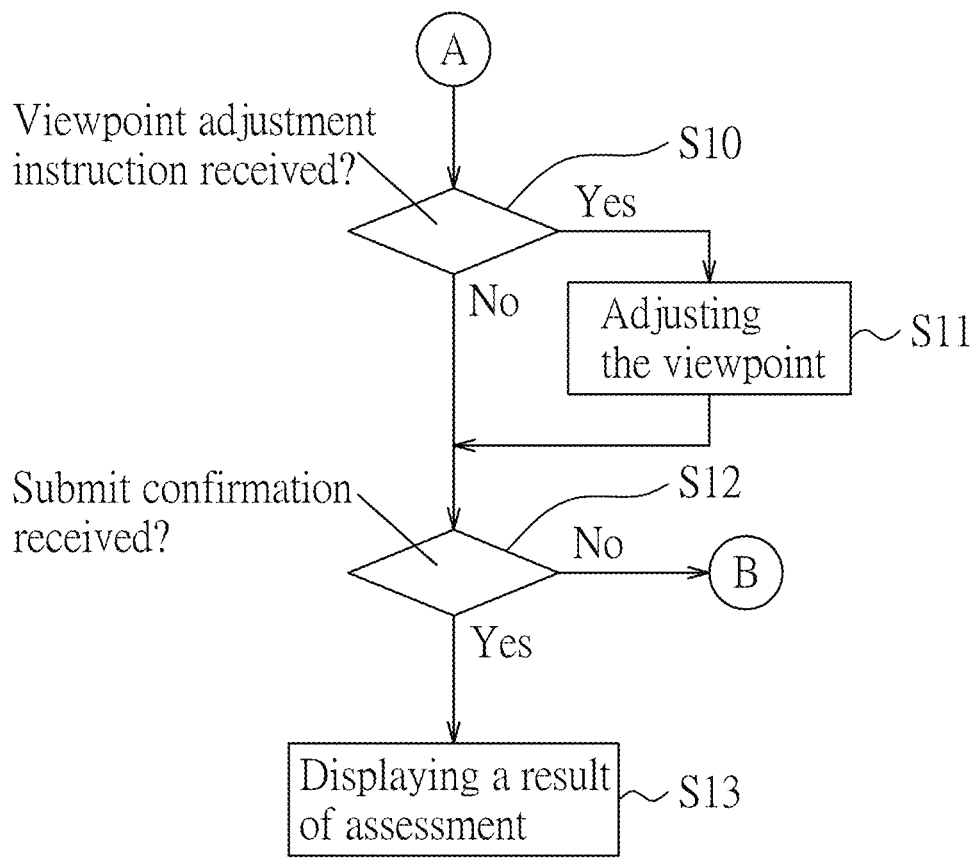

Referring to FIGS. 1 to 3, a method for performing assessment of spatial ability of a user according to the disclosure is illustrated. The method is to be implemented by the system 100 that is previously discussed. The method includes steps S01 to S13 described as follows.

In step S01, the processor 3 generates the assessment interface 4 which includes the virtual three-dimensional environment 400 that has the horizontal plane 43, the first vertical plane 41, the second vertical plane 42, and different kinds of options 401 to 409 as shown in FIGS. 3 to 8. The options 401 to 409 may be implemented as virtual buttons, pull-down menus, side-pull menus or any other interactive icons. The horizontal plane 43, the first vertical plane 41 and the second vertical plane 42 are perpendicular to each other and cooperatively define the virtual space 44. Specifically speaking, the virtual three-dimensional environment 400 can be expressed by a Cartesian coordinate system, i.e., the X-Y-Z coordinates as shown in FIG. 3, wherein the horizontal plane 43 is defined by the X-Z coordinates, the first vertical plane 41 is defined by the X-Y coordinates, and the second vertical plane 42 is defined by the Y-Z coordinates. Furthermore, the virtual three-dimensional environment 400 includes grids 46 distributed on the horizontal plane 43, the first vertical plane 41 and the second vertical plane 42. The first vertical plane 41 is illustrated with the first projection graphic 411 which depicts the projection of the expected virtual object in the virtual space 44 onto the first vertical plane 41. The second vertical plane 42 is illustrated with the second projection graphic 421 which depicts another projection of the expected virtual object in the virtual space 44 onto the second vertical plane 42. Thereafter, the processor 3 controls the display 1 to display the assessment interface 4 thus generated. Activating a menu-releasing option 401 allows the menu showing the options of a plurality of building blocks 402 to be displayed on the display 1 as shown in FIG. 4.

Referring to FIGS. 1, 2A, 2B, 4 and 5, in step S02, the processor 3 determines whether the processor 3 receives the selection instruction designating a selected one of the building blocks via the input device 2 according to the menu showing the options of a plurality of building blocks 402. When it is determined by the processor 3 that the selection instruction is not received via the input device 2, a flow of the procedure of the method proceeds to step S04. Otherwise, the flow proceeds to step S03.

When it is determined that the processor 3 has received the selection instruction via the input device 2, in step S03, the processor 3 controls the display 1 to refresh display of the assessment interface 4 on the display 1 such that the selected one of the building blocks appears in the virtual space 44 (two building blocks 45 have been selected and appear in the virtual space 44 as shown in FIG. 5). In this embodiment, when the menu-releasing option 401 is activated, the menu showing the options of a plurality of building blocks 402 will be spread out at the lower-left side of the display 1 as shown in FIG. 4. When one of the options in the menu showing the options of a plurality of building blocks 402 is selected, the selection instruction associated with the selected one of the options is to be received by the processor 3 for the control of the display 1 to refresh display of the assessment interface 4 on the display 1 such that the selected one of the building blocks corresponding to the selected one of the options appears in the virtual space 44 as shown in FIG. 5.

Referring to FIGS. 1, 2A, 2B and 5, in step S04, the processor 3 determines whether the processor 3 has received the withdrawal instruction that results from activation of a withdrawal option 403 via the input device 2. When it is determined that the processor 3 has received the withdrawal instruction via the input device 2, the processor 3 controls the display 1 to refresh display of the assessment interface 4 on the display 1 such that the a selected one of the building block(s) 45 previously appearing in the virtual space 44 disappears from the virtual space 44 in step S05. Otherwise, when it is determined by the processor 3 that the processor 3 has not received the withdrawal instruction via the input device 2, the flow of the procedure of the method proceeds to step S06.

Specifically speaking, in this embodiment, when one of the building block(s) 45 appearing in the virtual space 44 is selected, the withdrawal option 403, a rotation option 404 and a shift option 408 will be provided as illustrated in FIG. 5. By activating the withdrawal option 403 through selection thereof, the withdrawal instruction associated with the selected one of the building block(s) 45 appearing in the virtual space 44 is to be received by the processor 3 for the control of the display 1 to refresh display of the assessment interface 4 on the display 1 such that the selected one of the building block(s) 45 previously appearing in the virtual space 44 disappears from the virtual space 44.

In step S06, the processor 3 determines whether the processor 3 has received the movement instruction via the input device 2. When it is determined that the processor 3 has received the movement instruction via the input device 2, the processor 3 controls the display 1 to refresh display of the assessment interface 4 on the display 1 such that a selected one of the building block(s) 45 appearing in the virtual space 44 is moved in the virtual space 44 in step S07. Otherwise, when it is determined by the processor 3 that the processor 3 has not received the movement instruction via the input device 2, the flow of the procedure of the method proceeds to step S08.

Specifically speaking, in this embodiment, the selected one of the building block(s) 45 appearing in the virtual space 44 is controlled to move along the horizontal plane 43 of the virtual space 44 by dragging the selected one of the building block(s) 45 appearing in the virtual space 44 via the input device 2, and is controlled to move along the Y axis by operating the shift option 408 via the input device 2. Dragging the selected one of the building block(s) 45 appearing in the virtual space 44 via the input device 2 or operating the shift option 408 via the input device 2 generates the movement instruction that is to be received by the processor 3 for the control of the display 1 to refresh display of the assessment interface 4 on the display 1 such that the selected one of the building block(s) 45 appearing in the virtual space 44 is moved in the virtual space 44. In this embodiment, the minimum unit of movement distance in which the selected one of the building block(s) 45 appearing in the virtual space 44 can be moved is a side length of one of the grids 46.

Referring to FIGS. 1, 2A, 2B, 5 and 6, in step S08, the processor 3 determines whether the processor 3 has received the rotation instruction via the input device 2. When it is determined by the processor 3 that the processor 3 has not received the rotation instruction via the input device 2, the flow of the procedure of the method proceeds to step S10. Otherwise, when it is determined that the processor 3 has received the rotation instruction via the input device 2, the processor 3 controls the display 1 to refresh display of the assessment interface 4 on the display 1 such that a selected one of the building block(s) 45 appearing in the virtual space 44 is rotated in the virtual space 44 in step S09.

Figure 6:
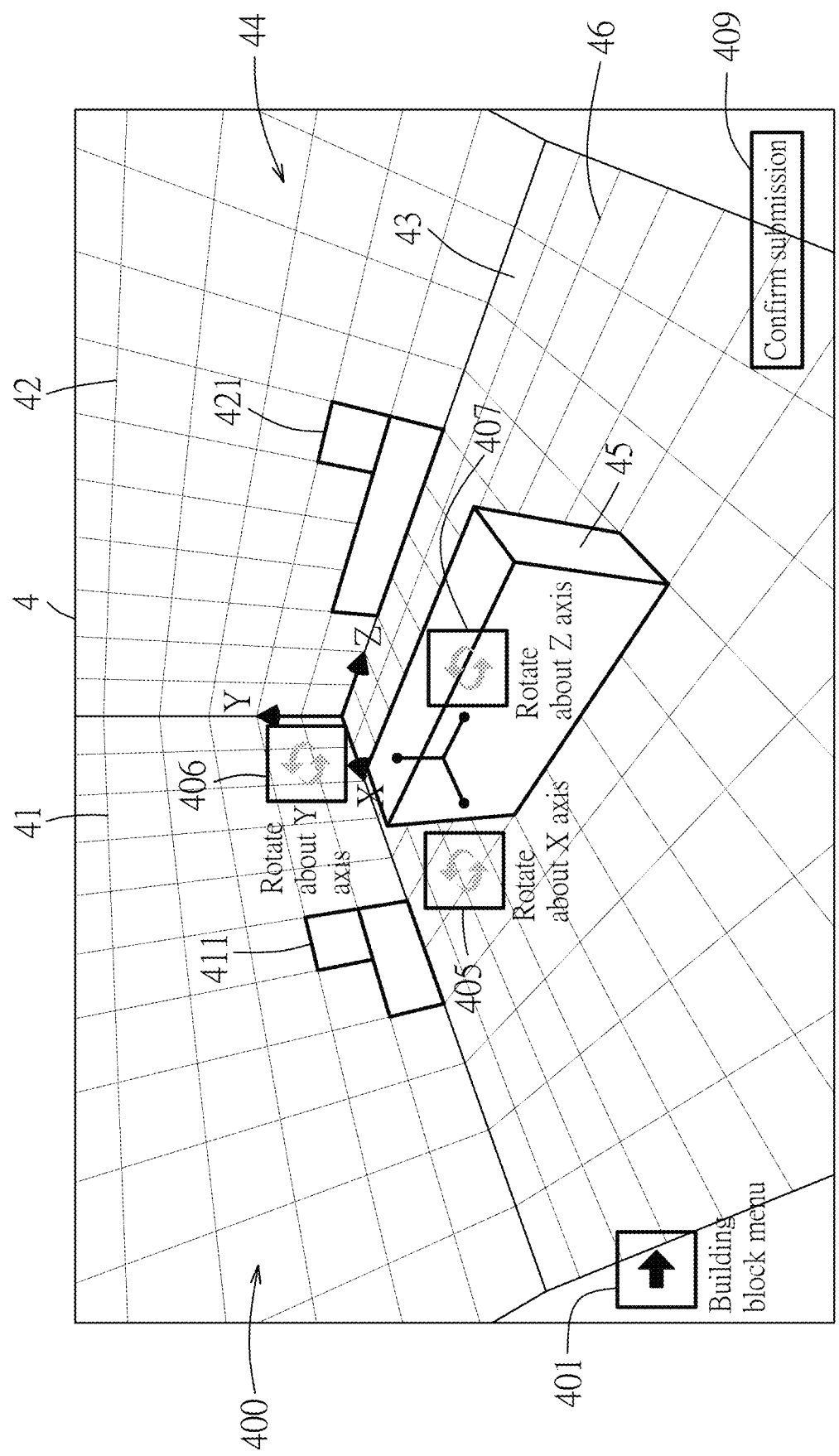
FIG. 6 is a schematic diagram illustrating embodiments of options for rotating a selected one of the building block(s) about different axes in the assessment interface.

Specifically speaking, referring to FIGS. 5 and 6, when the rotation option 404 associated with the selected one of the building block(s) 45 appearing in the virtual space 44 is activated, in step S09, the selected one of the building block(s) 45 appearing in the virtual space 44 can be controlled to rotate about one of the X, Y and Z axes in the virtual space 44 depending on which one of an option of rotating about the X axis 405, an option of rotating about the Y axis 406, and an option of rotating about the Z axis 407 is activated (selected). Activating said one of the option of rotating about the X axis 405, the option of rotating about the Y axis 406, and the option of rotating about the Z axis 407 via the input device 2 generates the rotation instruction that is to be received by the processor 3 so that in step S09, the processor 3 controls the display 1 to refresh display of the assessment interface 4 on the display 1 such that the selected one of the building block(s) 45 appearing in the virtual space 44 is rotated about the corresponding one of the X, Y and Z axes in the virtual space 44. In this embodiment, the minimum unit angle of rotating the selected one of the building block(s) 45 appearing in the virtual space 44 is ninety degrees.

Referring to FIGS. 1, 2A, 2B, 7 and 8, in step S10, the processor 3 determines whether the processor 3 has received the viewpoint adjustment instruction via the input device 2. When it is determined by the processor 3 that the processor 3 has not received the viewpoint adjustment instruction via the input device 2, the flow of the procedure of the method proceeds to step S12. Oppositely, the flow of the procedure of the method proceeds to step S11.

Figure 7:
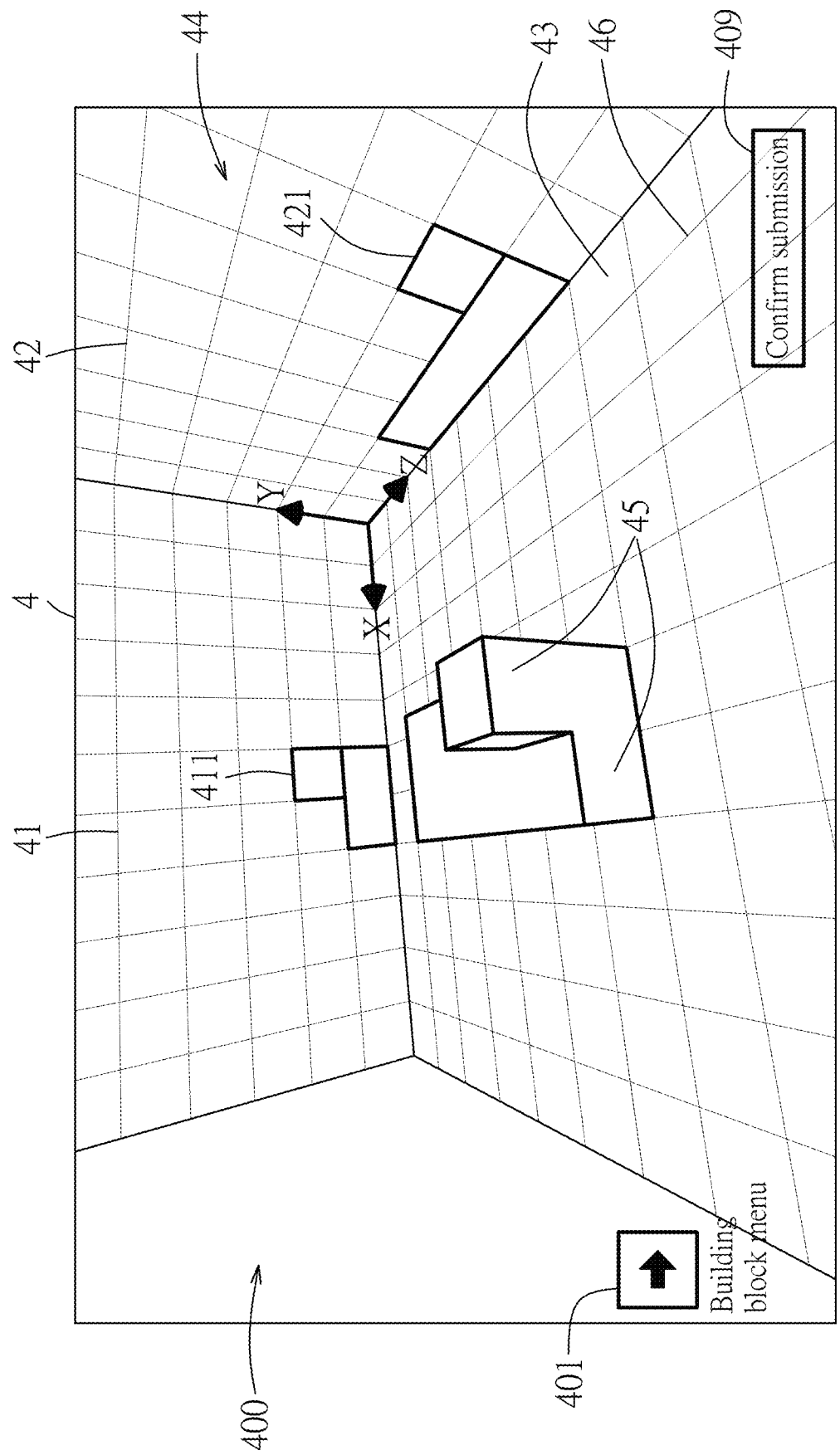
FIG. 7 is a schematic diagram illustrating an embodiment of a viewpoint of a virtual space in the assessment interface.
Figure 8:
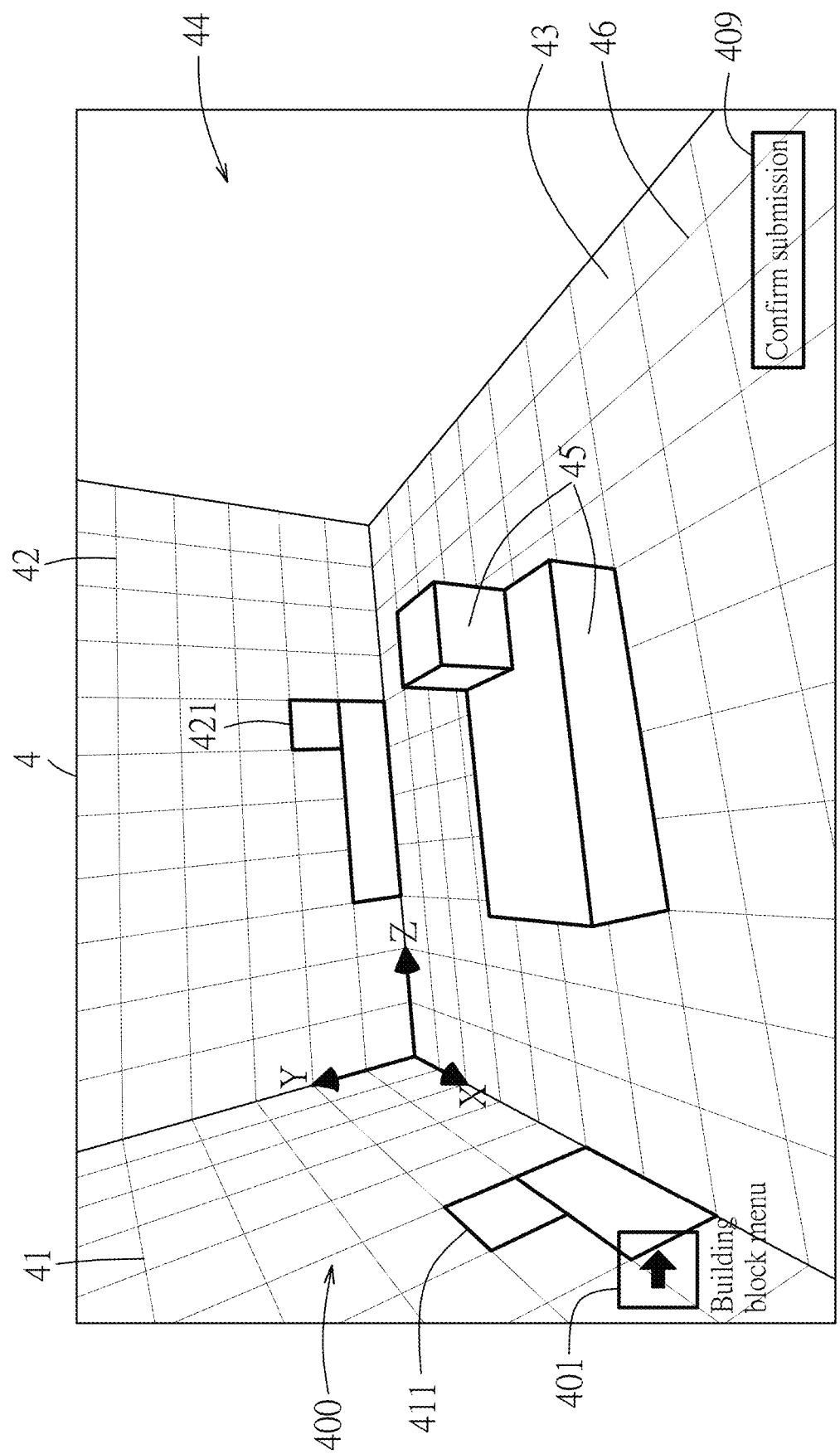
FIG. 8 is a schematic diagram illustrating an embodiment of another viewpoint of the virtual space in the assessment interface.

When it is determined that the processor 3 has received the viewpoint adjustment instruction via the input device 2, in step S11, the processor 3 adjusts the viewpoint of the virtual space 44 in the three-dimensional environment 400 displayed by the display 1, such as two examples of viewpoints of the virtual space 44 respectively shown in FIGS. 7 and 8.

In step S12, the processor 3 determines whether the processor 3 has received a submit confirmation resulting from activation of a submit confirmation option 409. When it is determined by the processor 3 that the processor 3 has received the submit confirmation, the flow of procedure proceeds to step S13. Otherwise, when it is determined by the processor 3 that the processor 3 has not received the submit confirmation, the flow of procedure goes back to step S02.

In step S13, when it is determined by the processor 3 that the asserted virtual object formed by the arrangement of the building block(s) 45 appearing in the virtual space 44 conforms with, in terms of both structure and location, the expected virtual object that corresponds to the first projection graphic 411 and the second projection graphic 421, the processor 3 controls the display 1 to display the result of the assessment indicating that the user has answered correctly. On the other hand, when it is determined by the processor 3 that the asserted virtual object formed by the arrangement of the building block(s) 45 appearing in the virtual space 44 does not conform with the expected virtual object, the processor 3 controls the display 1 to display the result of the assessment indicating that the user has answered incorrectly.

In summary, the method provides the assessment interface which includes the projection graphics relating to the expected virtual object so as to request a response relating to the asserted virtual object formed by the arrangement of the selected one(s) of the building block(s), and then the method provides the result of the assessment based on the response. Therefore, the method can be utilized to assist with the assessment of spatial ability of a user.

In the description above, for the purposes of explanation, numerous specific details have been set forth in order to provide a thorough understanding of the embodiment. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects, and that one or more features or specific details from one embodiment may be practiced together with one or more features or specific details from another embodiment, where appropriate, in the practice of the disclosure.

While the disclosure has been described in connection with what is considered the exemplary embodiment, it is understood that this disclosure is not limited to the disclosed embodiment but is intended to cover various arrangements included within the spirit and scope of the broadest interpretation so as to encompass all such modifications and equivalent arrangements.

What is claimed is:

1. A method for performing assessment of spatial ability of a user, to be implemented by a system, the system including a display screen, an input device and a processor, the method comprising:
   generating, by the processor, an assessment interface which includes a virtual three-dimensional environment having a horizontal plane, a first vertical plane, a second vertical plane, grids distributed on the horizontal plane, the first vertical plane and the second vertical plane, a confirmation option button, and a menu button for showing options of a plurality of building blocks, the horizontal plane, the first vertical plane and the second vertical plane being perpendicular to each other and cooperatively defining a virtual space, the first vertical plane being illustrated with a first projection graphic which depicts a projection of an expected virtual object in the virtual space onto the first vertical plane, the second vertical plane being illustrated with a second projection graphic which depicts another projection of the expected virtual object in the virtual space onto the second vertical plane;
   controlling, by the processor, the display screen to display the assessment interface thus generated;
   activating, by the processor, the menu button with a user input via the input device to appear the options of the plurality of building blocks in the virtual space;
   receiving, by the processor, a user selection of one of the plurality of building blocks via the input device;
   controlling, by the processor, the display screen to refresh display of the assessment interface on the display screen and moving the selected one of the building block(s) to appear the selected one of the building block(s) in the horizontal plane of the virtual space;
   receiving, by the processor, a user selection of the selected one of the building block(s) appeared in the horizontal plane of the virtual space;
   displaying, by the processor, a first additional options to manipulate the selected one of the building block(s) appeared in the horizontal plane of the virtual space;
   receiving, by the processor, a user selection of one of the first additional options to rotate the selected one of the building block(s) appeared in the horizontal plane of the virtual space;
   controlling, by the processor, the display screen to refresh display of the assessment interface on the display screen, displaying a second additional options of rotating about x, y, and z axes, and rotating the selected one of the building block(s) depending on a user selection of one of the second additional options in the virtual space;
   controlling, by the processor when it is determined by the processor that an asserted virtual object formed by an arrangement of the selected one of the building block(s) in the virtual space conforms with both structure and location of the expected virtual object that corresponds to the first projection graphic and the second projection graphic, the display screen to display a result of the assessment indicating that the user has answered correctly; and
   controlling, by the processor when it is determined by the processor that the asserted virtual object formed by the arrangement of the selected one of the building block(s) in the virtual space does not conform with the expected virtual object that that corresponds to the first projection graphic and the second projection graphic, the display screen to display a result of the assessment indicating that the user has answered incorrectly.

2. The method as claimed in claim 1, further comprising controlling, by the processor after receiving a withdrawal option from the first additional options by the user designating withdrawal of a selected one of the building block(s) in the virtual space via the input device, the display screen to refresh display of the assessment interface on the display screen such that the selected one of the building block(s) disappears from the virtual space.

3. The method as claimed in claim 1, further comprising: adjusting, by the processor after receiving a viewpoint adjustment instruction from the user designating a change of viewpoint via the input device, the viewpoint of the virtual space in the virtual three-dimensional environment on the display screen.

4. A system for performing assessment of spatial ability of a user, said system comprising:
   a display screen;
   an input device; and
   a processor that is electrically connected to said display screen and said input device, and that is configured to
   generate an assessment interface which includes a virtual three-dimensional environment having a horizontal plane, a first vertical plane, a second vertical plane, grids distributed on the horizontal plane, the first vertical plane and the second vertical plane, a confirmation option button, and a menu button for showing options of a plurality of building blocks, the horizontal plane, the first vertical plane and the second vertical plane being perpendicular to each other and cooperatively defining a virtual space, the first vertical plane being illustrated with a first projection graphic which depicts a projection of an expected virtual object in the virtual space onto the first vertical plane, the second vertical plane being illustrated with a second projection graphic which depicts another projection of the expected virtual object in the virtual space onto the second vertical plane,
   control said display screen to display the assessment interface thus generated,
   activate the menu button with a user input via the input device to appear the options of the plurality of building blocks in the virtual space,
   receive a user selection of one of the plurality of building blocks via the input device,
   control, said display screen to refresh display of the assessment interface on said display screen and move the selected one of the building block(s) to appear the selected one of the building block(s) in the horizontal plane of the virtual space, receive a user selection of the selected one of the building block(s) appeared in the horizontal plane of the virtual space, display a first additional options to manipulate the selected one of the building block(s) appeared in the horizontal plane of the virtual space, receive a user selection of one of the first addition options to rotate the selected one of the building block(s) appeared in the horizontal plane of the virtual space, control, said display screen to refresh display of the assessment interface on said display screen, display a second additional options of rotating about x, y, and z axes, and rotate the selected one of the building block(s) depending on a user selection of one of the second additional options in the virtual space, control, when it is determined by said processor that an asserted virtual object formed by an arrangement of the selected one of the building block(s) in the virtual space conforms with both structure and location of the expected virtual object that corresponds to the first projection graphic and the second projection graphic, said display screen to display a result of the assessment indicating that the user answered correctly, and control, when it is determined by the processor that the asserted virtual object formed by the arrangement of the selected one of the building block(s) in the virtual space does not conform with the expected virtual object that that corresponds to the first projection graphic and the second projection graphic, the display screen to display a result of the assessment indicating that the user has answered incorrectly.

5. The system as claimed in claim 4, wherein said processor is further configured to control, after receiving a withdrawal option from the first additional options by the user designating withdrawal of a selected one of the building block(s) in the virtual space via said input device, said display screen to refresh display of the assessment interface on said display screen such that the selected one of the building block(s) disappears from the virtual space.

6. The system as claimed in claim 4, wherein said processor is further configured to adjust, after receiving a viewpoint adjustment instruction from the user designating a change of viewpoint via said input device, the viewpoint of the virtual space in the virtual three-dimensional environment on said display screen.

* * * * *